United States Patent
Yasukawa

Patent Number: 5,717,961
Date of Patent: Feb. 10, 1998

[54] AUTOMATIC FOCUS ADJUSTMENT DEVICE CAPABLE OF ACCURATELY DRIVING A PHOTOGRAPHIC LENS TO AN END POINT OF MOVEMENT

[75] Inventor: Seiichi Yasukawa, Yotsukaido, Japan

[73] Assignee: Nikon Corporation, Tokyo, Japan

[21] Appl. No.: 522,581

[22] Filed: Sep. 1, 1995

[30] Foreign Application Priority Data

Nov. 2, 1994 [JP] Japan ................................. 6-269901

[51] Int. Cl.$^6$ .................... G03B 3/10; G03B 3/00; G03B 13/36
[52] U.S. Cl. .................. 396/87; 396/77; 396/86; 396/81; 396/82; 318/640; 318/652
[58] Field of Search ......................... 354/402; 318/638, 318/639, 640, 652; 396/77, 80–82, 85–87

[56] References Cited

U.S. PATENT DOCUMENTS

| | | | |
|---|---|---|---|
| 4,772,909 | 9/1988 | Ogasawara | 354/402 |
| 4,994,841 | 2/1991 | Ishida et al. | 354/402 |
| 5,003,337 | 3/1991 | Amano | 354/402 |
| 5,113,209 | 5/1992 | Ueyama et al. | 354/402 |
| 5,179,407 | 1/1993 | Kusaka et al. | 354/402 |
| 5,208,625 | 5/1993 | Suekane | 354/402 |
| 5,212,513 | 5/1993 | Ishida et al. | 354/402 |
| 5,231,437 | 7/1993 | Kashiyama et al. | 354/152 |
| 5,327,190 | 7/1994 | Nakamura et al. | 354/402 |
| 5,396,306 | 3/1995 | Kawasaki et al. | 396/86 |
| 5,400,109 | 3/1995 | Shiokama | 354/402 |
| 5,438,387 | 8/1995 | Shiokama et al. | 354/402 |

*Primary Examiner*—Howard B. Blankenship
*Assistant Examiner*—Michael Dalakis

[57] ABSTRACT

An automatic focus adjustment device which accurately performs end point detection of the range of movement of a photographic lens to smoothly drive the photographic lens completely to a focus position. The automatic focus adjustment device includes a defocus amount detection device to detect a position deviation of the image position of a subject formed by the photographic lens from an image forming plane. An actuation amount necessary to drive the photographic lens by the detected defocus amount is calculated. An actual actuation amount decision device decides whether the actual actuation amount output to drive the lens is within a permissible range predetermined for the drive. A first lens displacement decision device decides whether the lens position changes during a predetermined first time period, and a second lens displacement decision device decides whether the lens position changes during a predetermined second time period when the actual actuation amount decision device decides that the actual actuation amount is outside the permissible range. The actual actuation amount setting device sets the actuation amount used to drive the lens according to the decisions by the first and second lens displacement decision devices.

11 Claims, 5 Drawing Sheets

AUTOMATIC FOCUS ADJUSTMENT DEVICE CAPABLE OF ACCURATELY DRIVING A PHOTOGRAPHIC LENS TO AN END POINT OF MOVEMENT

BACKGROUND OF THE INVENTION

1. Field of the Invention

The present invention relates to an automatic focus adjustment device which accurately drives a photographic lens to an end point of its range of movement, and, more particularly, the present invention relates to an automatic focus adjustment device which detects the range of movement of the photographic lens and accurately drives the photographic lens to a desired point.

2. Description of the Related Art

Automatic focus adjustment devices for focusing a photographic lens have been applied to cameras and other optical instruments. In general, these kinds of automatic focus adjustment devices detect a position deviation of the subject image position from the image plane (the "defocus amount") using a well-known phase difference method, or the like. A residual drive amount required for the photographic lens to reach a focused position is calculated based on the detected defocus amount. The calculated residual drive amount is fed back as a control deviation to a drive mechanism of the photographic lens, the photographic lens is driven in a direction to reduce the defocus amount and is brought to a standstill at the focused position. During the above-described focus adjustment operation, when the end point of the range of movement of the photographic lens is reached, a large mechanical stress acts on the photographic lens or its drive mechanism.

To prevent the large mechanical stress from acting on the photographic lens or its drive mechanism, the prior art automatic focus adjustment device detects the position or distance of movement of the photographic lens. When the position of the photographic lens has not changed for a predetermined time, it is determined that the photographic lens has reached the end point of its range of movement. The drive of the photographic lens is then halted. However, the focus adjustment operation can not be smoothly performed with the prior art automatic focus adjustment device when a photographic lens requiring a large load torque for its extension is used, or when a photographic lens having a drive mechanism with a large frictional resistance is used, because the photographic lens does not begin to move at the beginning of the drive.

Further, another problem occurring with the prior art automatic focus adjustment device is that the photographic lens tends to stop during a reduction of the speed close to the focused position without reaching the focused position. When the photographic lens stops before reaching the focused position, the position of the photographic lens does not change, and it is erroneously determined that the photographic lens has reached the end point. Furthermore, when the movement of the photographic lens has stopped, it is difficult to restart the movement to reach a focused position.

SUMMARY OF THE INVENTION

It is an object of the present invention to provide an automatic focus adjustment device which accurately detects the end point of the range of movement of the photographic lens.

It is another object of the present invention to provide an automatic focus adjustment device which reliably drives a photographic lens to an end point of the range of movement of the photographic lens when performing focus adjustment.

Objects and advantages of the present invention are achieved with a focus adjustment device including a drive device which drives the photographic lens in the optical axis direction; a defocus amount detection device to detect the defocus amount, which is the deviation of the position of the image of the subject formed by the photographic lens from the image plane; an actuation amount calculation unit to calculate an actuation amount for the drive device to cause the photographic lens to move by the detected defocus amount; an actual actuation amount setting device to set the actual actuation amount output to the drive device; a lens position detection device to detect the lens position of the photographic lens; an actual actuation amount decision device to decide whether or not the actual actuation amount output to the drive device is within a permissible range which has been predetermined for the drive device; a first lens displacement decision device to decide whether or not the lens position which has been detected by the lens position detection device changes during a predetermined first time period; and a second lens displacement decision device which, when the actual actuation amount decision device decides that the actual actuation amount is outside the permissible range for the drive device, decides whether or not the lens position which has been detected by the lens position detection device changes during a predetermined second time period.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
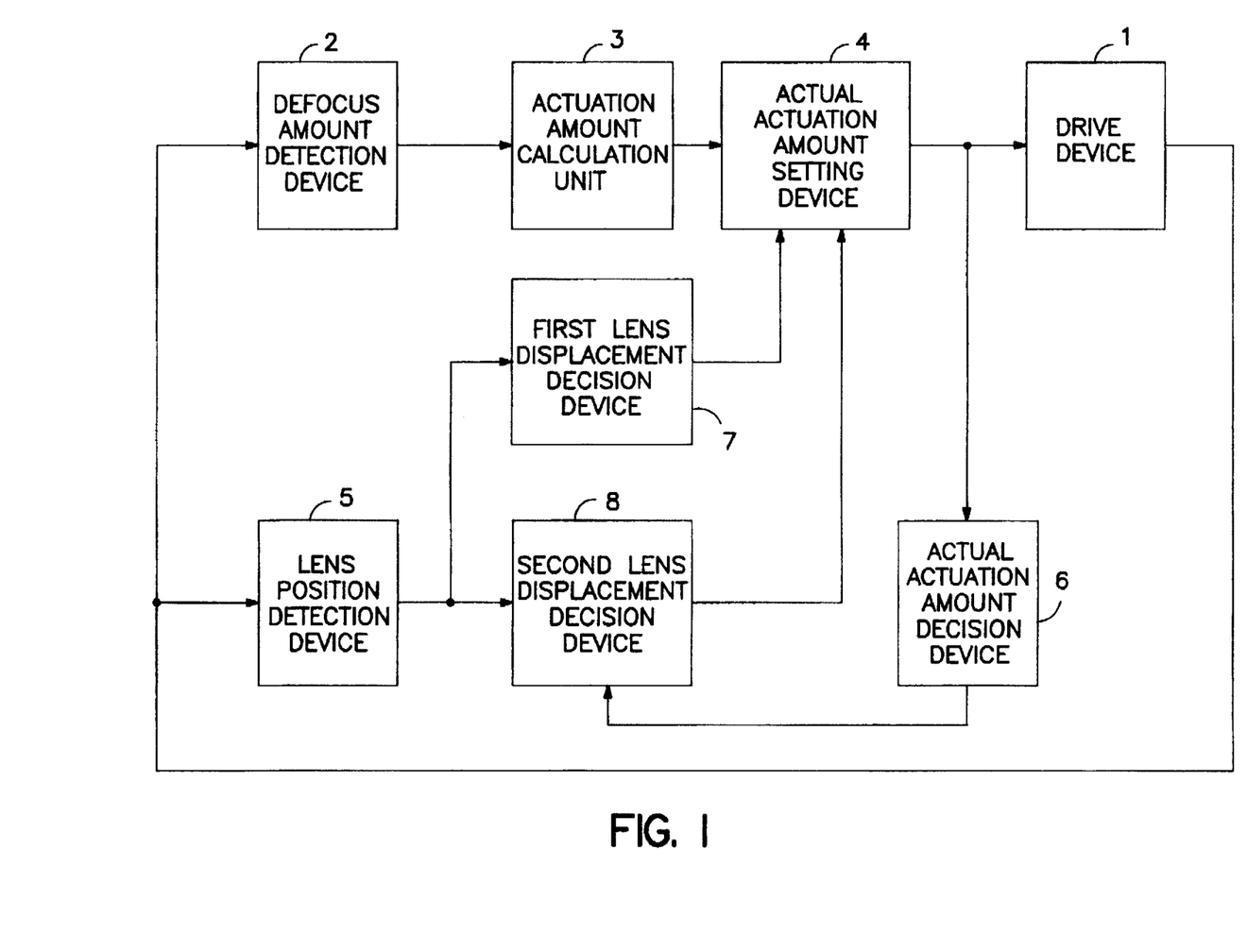
FIG. 1 is a block diagram of an automatic focus adjustment device in accordance with embodiments of the present invention.

As shown in FIG. 1, the focus adjustment device in accordance with embodiments of the present invention includes a drive device 1 which drives the photographic lens in the optical axis direction; a defocus amount detection device 2 to detect the defocus amount, which is the deviation of the position of the image of the subject formed by the photographic lens from the image plane; an actuation amount calculation unit 3 to calculate an actuation amount for the drive device 1 to cause the photographic lens to move by the detected defocus amount; an actual actuation amount setting device 4 to set the actual actuation amount output to the drive device 1; a lens position detection device 5 to detect the lens position of the photographic lens; an actual actuation amount decision device 6 to decide whether or not the actual actuation amount output to the drive device 1 is within a permissible range which has been predetermined for the drive device 1; a first lens displacement decision device 7 to decide whether or not the lens position which has been detected by the lens position detection device 5 changes during a predetermined first time period; and a second lens displacement decision device 8 which, when the actual actuation amount decision device 6 decides that the actual actuation amount is outside the permissible range for the drive device, decides whether or not the lens position which has been detected by the lens position detection device 5 changes during a predetermined second time period.

The actual actuation amount setting device 4 sets the actual actuation amount according to inputs from the first lens displacement decision device 7, the second lens displacement decision device 8, and the actuation amount calculation unit 3. Specifically, in a first case, in which it has been decided by the second lens displacement decision device 8 that the lens position does not change, the actual actuation amount setting device 4 causes the actual actuation amount to decrease; and, in a second case, in which it has been decided by the second lens displacement decision device 8 that the lens position does not change, and it has also been decided by the first lens displacement decision device 7 that the lens position does not change, the actual actuation amount setting device 4 sets, as the actuation amount, the larger of the actual actuation amount presently output to the drive device 1 increased by a predetermined amount, and the actuation amount calculated by the actuation amount calculation unit 3; and, in a third case, in which it has been decided by the first lens displacement decision device 7 that the lens position has changed, the actual actuation amount setting device 4 sets the actuation amount as the actual actuation amount.

In accordance with embodiments of the present invention, the predetermined second time period is set longer than the predetermined first time period.

The defocus amount detected by the defocus amount detection device 2 corresponds to the amount of movement of the photographic lens required to obtain the focused state. The actuation amount calculation unit 3 calculates the actuation amount of the photographic lens, which is the amount of movement required to cause the photographic lens to move by the defocus amount. On the other hand, the "actual actuation amount" is the actuation amount actually applied to the drive device 1 which is output from the actual actuation amount setting device 4.

The actual actuation amount decision device 6 decides whether or not the value of the actual actuation amount output from the actual actuation amount setting device 4 is within the permissible range of the drive device 1. The permissible range is a previously established suitable range of actuation amount for the drive device 1 which is established from the absolute rating of the drive device 1, or a range suitably established from the design of the drive device.

The first lens displacement decision device 7 decides whether or not the lens position changes within a predetermined first time period. The second lens displacement decision device 8 decides, when an actual actuation amount outside the permissible range has been applied to the drive device 1, whether or not the lens position changes within a predetermined second time. Based on the decisions of the first and second lens displacement decision devices 7 and 8, the actual actuation amount setting device 4 sets the actuation amount which is output to the drive device 1 in the following manner.

In a first case, it is determined that the photographic lens is at the end point when an actual actuation amount outside the permissible range has been applied to the drive device 1, and when the second lens displacement decision device 8 determines that the lens position did not change within the second predetermined time period.

Further, in a second case, when an actual actuation amount within the permissible range has been applied to the drive device 1, and the lens position has not changed within the first predetermined time, the greater of the present actual actuation amount which has been caused to increase by a predetermined amount, and the actuation amount which has been calculated by the actuation amount calculation unit 3, is applied to the drive device 1.

Accordingly, when the photographic lens stops during driving due to the frictional resistance and the like of the drive device 1, the actuation amount is gradually increased until movement begins, and the photographic lens smoothly begins to move with an actual actuation amount close to the minimum, and is accurately moved as far as the focus position.

Further, by minutely increasing the actual actuation amount in the above-described manner, when the actual actuation amount exceeds the permissible range, similar to the above-described first case, the actual actuation amount setting device 4, decides that the photographic lens is at the end point, and causes a reduction of the actual actuation amount, mitigating the mechanical stress acting on the photographic lens or the drive device 1.

In a third case, when the lens position changes within the predetermined first time period, the drive device 1 outputs unchanged the actuation amount calculated by the actuation amount calculation unit 3 as the actual actuation amount, and the normal control operations are performed for focus adjustment.

Furthermore, by setting the second predetermined time period for the determination of whether or not the photographic lens has reached the end point, longer than the first predetermined time period, the detection of the end point is accurately performed.

Figure 2:
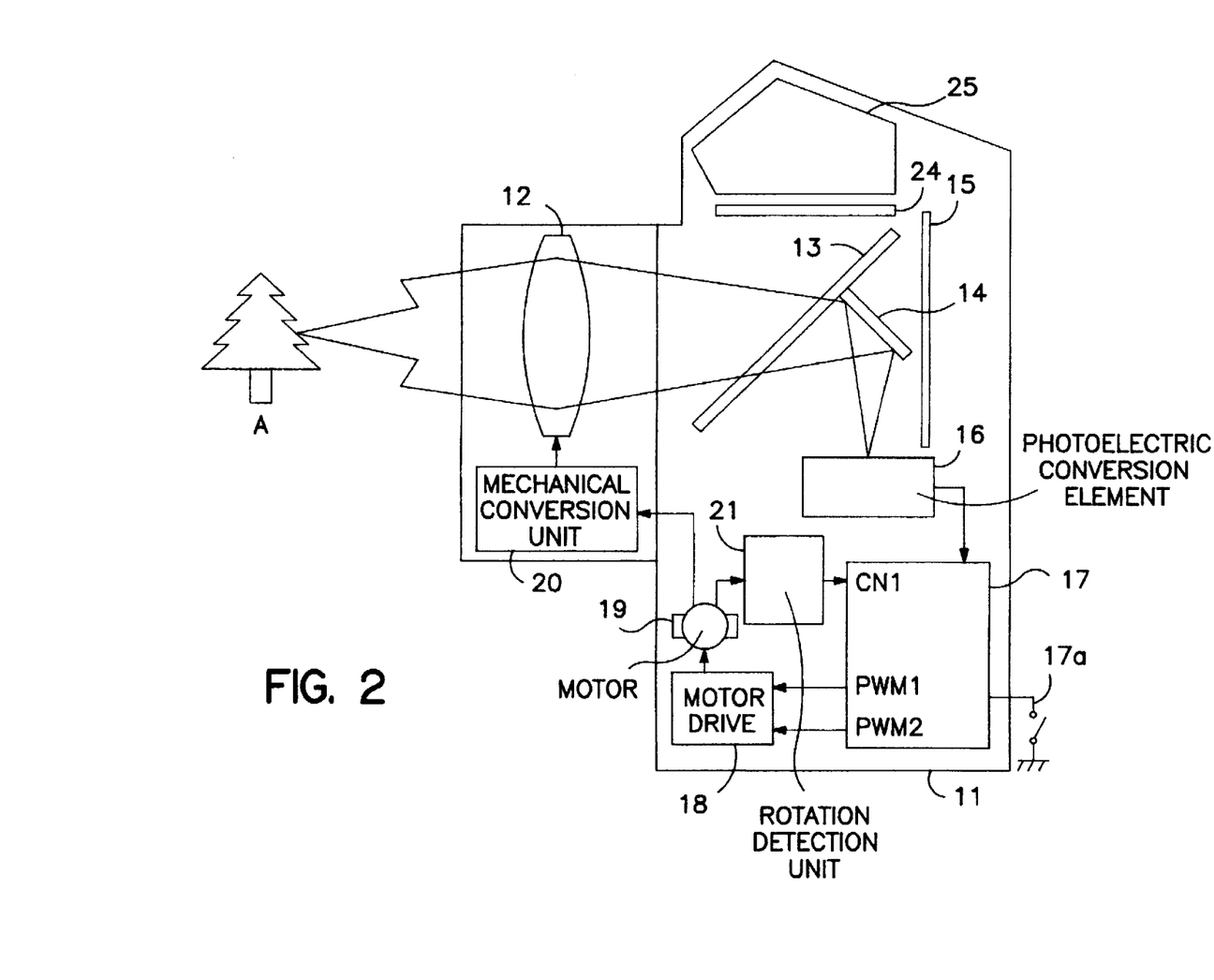
FIG. 2 is side view of a camera to which embodiments of the present invention are applied.

FIG. 2 is a block diagram showing a side view of a camera 11 in accordance embodiments of the present invention. As shown in FIG. 2, a photographic lens 12 of the camera 11 receives luminous flux from a subject A which passes through the photographic lens 12 and is incident upon a film plane 15. A semi-transparent main mirror 13 located inside the body of the camera 11 reflects the subject luminous flux upward during photographic preparatory operations to resolve the subject image on a viewfinder screen 24, such that the photographer is able to visually check the subject image via a pentagonal prism 25. Part of the luminous flux which passes through the main mirror 13 is guided downward by a totally reflecting sub-mirror 14 and enters a photoelectric conversion element 16, which is preferably a line CCD or the like. The main mirror 13 and the sub-mirror 14 spring upward toward the viewfinder screen 24 during exposure, allowing all of the luminous flux from the photographic lens 12 to reach the film plane 15 (image forming plane).

A control unit 17, which includes a microcomputer, controls all of the circuit components described in connection with embodiments of the present invention. An A/D converter, a memory and a timer clock are built into the control unit 17. A half-depression switch 17a connected to a release button (not shown) is connected to the control unit 17. Outputs PWM1 and PWM2 of the control unit 17 are connected to a motor drive 18. The photoelectric conversion element 16 is arranged in a location which is illuminated by light reflected by the sub-mirror 14 and outputs to the control unit 17 analog image signals corresponding to the luminous flux guided by the sub-mirror 14 to the photoelectric conversion element 17.

The motor drive 18 drives a motor 19 in accordance with the signals PWM1 and PWM2 received from the control unit 17 to shift the photographic lens 12. The rotation of the motor 19 is partly converted into movement of the photographic lens 12 in an optical axis direction by a mechanical conversion unit 20. As the motor 19 rotates, the motor's speed is detected by a rotation detection unit 21 and input to an input terminal CN1 of the control unit 17 which controls the movement of the photographic lens 12 to control the formation of an image on the image forming plane 15.

The motor drive 18, motor 19 and mechanical conversion unit 20 operate as a drive device; the photoelectric conversion element 16 and the control unit 17 operate as a defocus amount detection device; the rotation detection unit 21 and the control unit 17 operate as a lens position detection device.

The control unit 17 operates as an actuation amount calculation unit, an actual actuation amount setting device, an actual actuation amount decision device, a first lens position decision device and a second lens position decision device.

Figure 3:
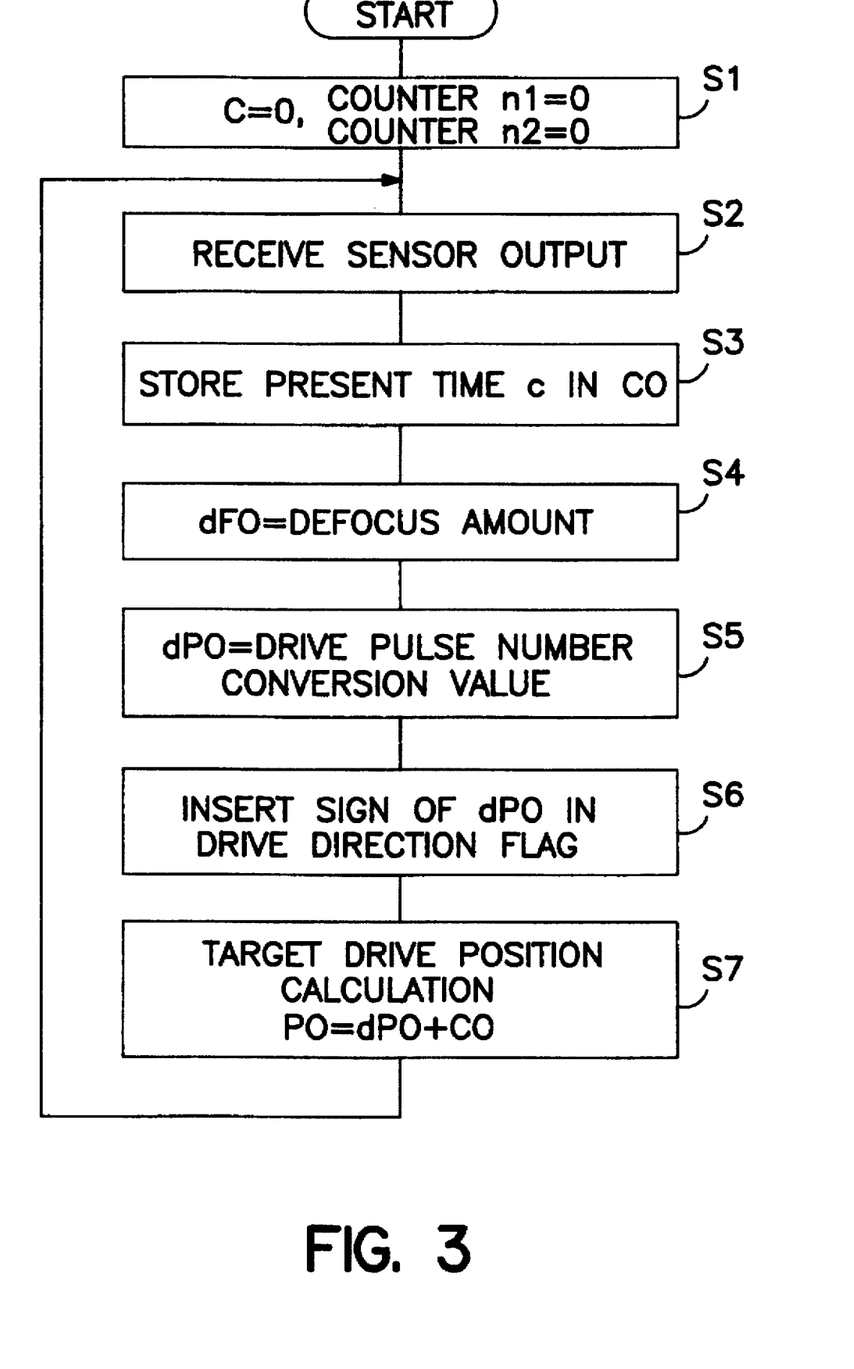
FIG. 3 is a flow chart showing an operational process for automatic focus adjustment in accordance with embodiments of the present invention.
Figure 4:
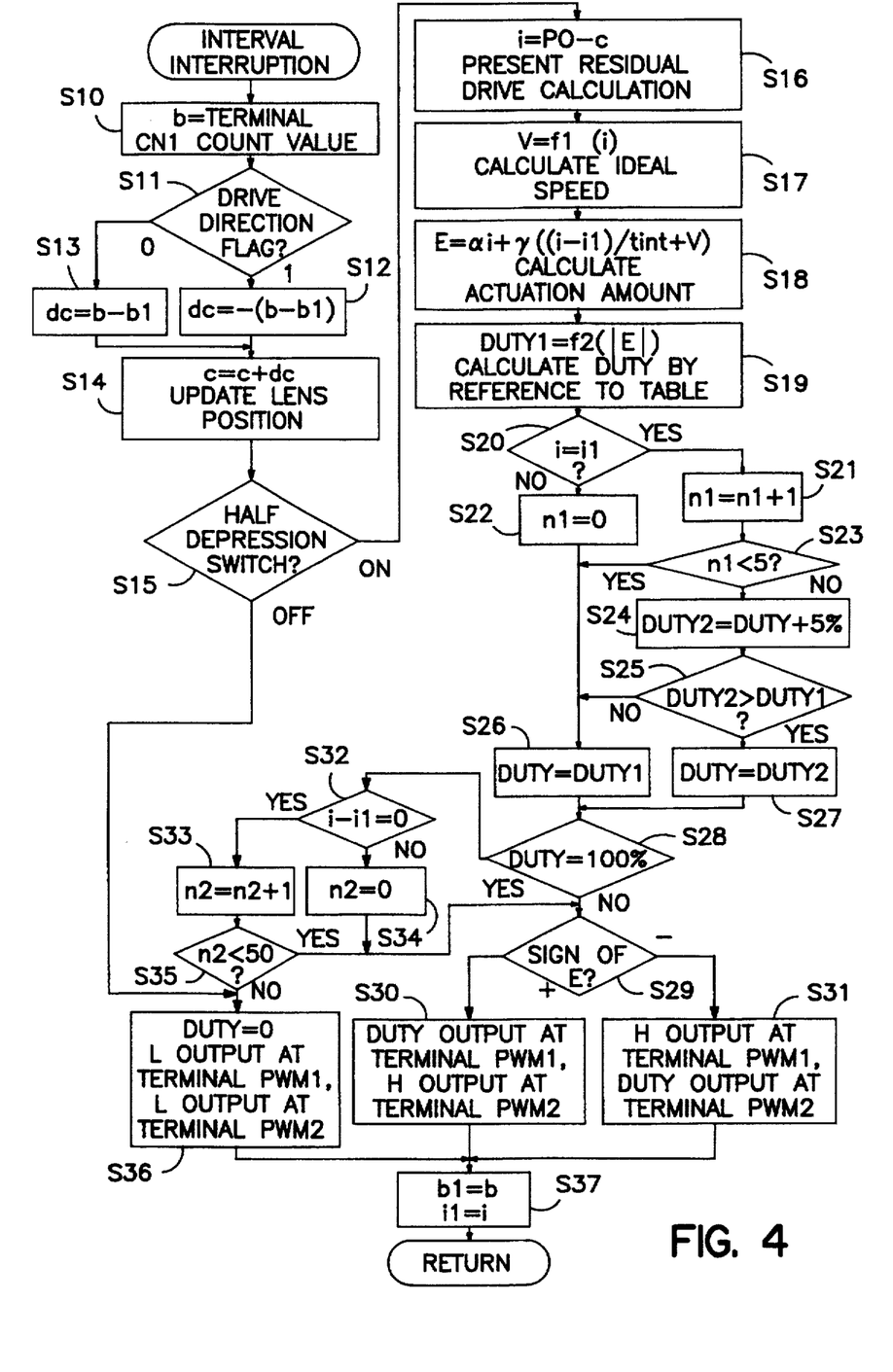
FIG. 4 is a flow chart showing an interruption operational process of the automatic focus adjustment device in accordance with embodiments of the present invention.

FIGS. 3 and 4 are flow charts of operational processes for performing automatic focus adjustment in accordance with embodiments of the present invention. FIG. 3 is a flow chart showing an operational process for determining a target drive position. FIG. 4 is a flow chart showing an interval interruption operational process.

As shown in FIG. 3, when power is supplied to the control unit 17, the lens position c is initialized at zero (step S1). A picture signal is then input from the photoelectric conversion element 16 (step S2), and the value of the present lens position c is stored in the variable CO (step S3).

The picture signal input from the photoelectric conversion element 16 is processed according to the well known phase difference detection method, and a defocus amount dFO, representing the position deviation in the optical axis direction of the subject image from the image plane, is calculated (step S4).

The defocus amount dFO is converted (step S5) into a value dPO representing a number of pulses which the rotation detection unit 21 outputs using a specific conversion coefficient for the particular photographic lens 12. A positive or negative sign of the defocus amount dFO is set in the sign bit of the value dPO, and the sign of dPO is used as a drive direction flag (step S6).

Next, the value dPO and the variable CO initially stored as the lens position are added, and a target drive position PO to which the photographic lens 12 is to be driven is calculated (step S7). The operational process then proceeds to step S2, and steps S2–S7 are reiterated.

Further, the interval interruption operational process shown in FIG. 4 is performed in parallel with the operational process performed in FIG. 3. The interval interruption operational process is performed every 1 msec. The control unit 17 controls the interval interruption operational process.

When the interval interruption operational process is commenced, a value b representing the counted output pulses of the rotation detection unit 21 is input to input CN1 of the control unit 17 (step S10). The positive or negative drive direction flag is appended to the difference of the count value b and a count value b1 representing the counted output pulses of the rotation detection unit 21 for a previous iteration of the interval interruption operational process, to produce a calculated value dc (steps S11–S13). The value dc is then added to the lens position c, to update the value of the lens position c (step S14).

Next, when it is determined that the half depression switch 17a has not been pressed (step S15), an actuation amount is not output by the motor drive 18 (step S36). Specifically, in step S36, the DUTY is set to zero by outputting an L level output at PWM 1 and an L level output at PWM 2 of control unit 17.

However, when the half depression switch 17a is pressed, using the values of the target drive position PO and the lens position c, a residual drive amount i of the motor 19 is calculated using Equation (1) below (step S16):

$$i = PO - c \qquad \text{(Equation 1)}$$

Figure 5:
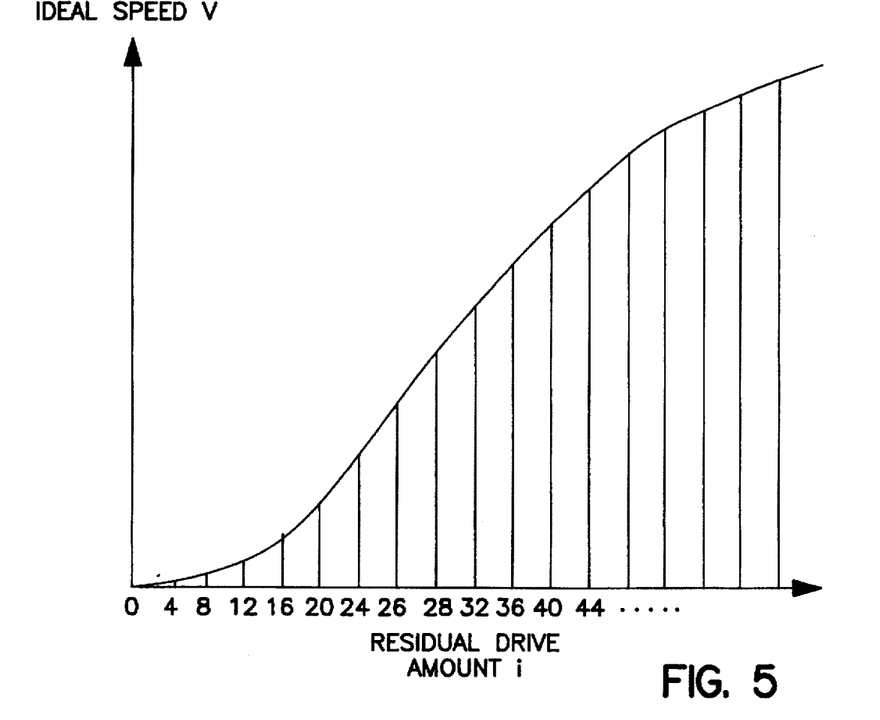
FIG. 5 is a graph showing an example of an ideal speed for lens movement in accordance with embodiments of the present invention.

Referring to a table stored in memory, such as a table storing the information shown in the graph of FIG. 5, the ideal speed V corresponding to the residual drive amount i may be looked up (step S17). The information shown in FIG. 5 may be stored, e.g., in a ROM table in the control unit 17. The ideal speed V corresponding to the residual drive amount i is a value which sets a suitable level of drive speed for the photographic lens 12.

An actuation amount E is then calculated (step S18) based on the residual drive amount i1 for the previous iteration of the interval interruption operational process, and the interval tint of the interval interruption operational process, using Equation (2) below.

$$E = \alpha \cdot i + \gamma \cdot [(i - i1)/\text{tint} + V] \qquad \text{(Equation 2)}$$

Then, a necessary drive duty value DUTY1 to provide the motor 19 with an effective current suited to the absolute value of the actuation amount E calculated in the manner set forth in Equation (2) is set by reference to a table stored in memory (step S19).

When the present residual drive amount i and the previous residual drive amount i1 are equal, it is determined that the photographic lens 12 is stopped (step S20), and a first counter n1 is incremented by one (1) (step S21). The first counter n1 counts whether five iterations of the interval interruption operational process have been performed while the photographic lens 12 is stopped, which is equivalent to 5 msec elapsing, since the interval interruption operational process is performed every 1 msec. When the present residual drive amount i and the previous residual drive amount i1 are outside the predetermined range (i.e., the difference between i and i1 is not zero), the counter n1 is reset by setting n1 to zero (0) (step S22).

In step S23, it is determined whether n1 is less than 5. If the photographic lens 12 is stopped and n1 is greater than or equal to five (5) (step S23), then the larger of a value DUTY2, obtained by causing a 5% increase in the drive duty value DUTY presently output by the motor drive 18, and the drive duty value DUTY1 calculated in step S19, is set as the drive duty value DUTY for the next output of the drive duty (steps S24–S27).

When the photographic lens 12 is moving (corresponding to a NO determination in step S20), the drive duty value DUTY1 calculated in step S19 is set, unchanged, as the drive duty value DUTY for the next output of the drive duty.

Next, in step S28, it is determined whether the duty value DUTY for the next output of the drive duty is less than 100%. When the duty value DUTY for the next output of the drive duty is less than 100%, the waveform of the drive duty value DUTY, reversed according to the sign of the actuation amount E, (Step S29) is output by the motor drive 18 (steps S30, S31).

Moreover, when the drive duty value DUTY for the next output of the drive duty reaches 100% (step S28), an end point detection is performed. Specifically, it is decided (step S32) by the change in the residual drive amount i with respect to the previous residual drive amount i1 whether or not the photographic lens 12 is stopped. When the photographic lens 12 is stopped (a YES determination in step S32), a counter n2 is incremented by one (1) (step S33). When the photographic lens 12 is moving (a NO determination in step S32), the counter n2 is reset to zero (step S34). The counter n2 counts whether the interval interruption operational process has been repeated fifty (50) times, the equivalent of approximately 50 msec elapsing.

Accordingly, if the drive duty value DUTY is 100% (step S28), the photographic lens 12 is stopped, and a time required to repeat the interruption operational process fifty (50) times elapses (step S35), it is determined that the photographic lens 12 has reached the end point, and the duty value DUTY for the next output of the drive duty is made zero (0) (step S36).

After the interval interruption operational process has been performed, the residual drive amount i and the count value b are set to the residual drive amount i1 and the count value b1, respectively, for the next iteration of the interval interruption operational process (step S37), and the interval interruption operational process returns.

Figure 6A:
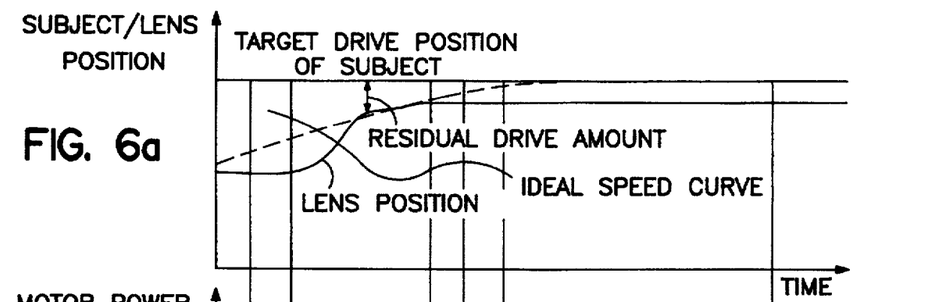
FIGS. 6a and 6b are graphs showing end point detection in accordance with embodiments of the present invention.
Figure 6B:
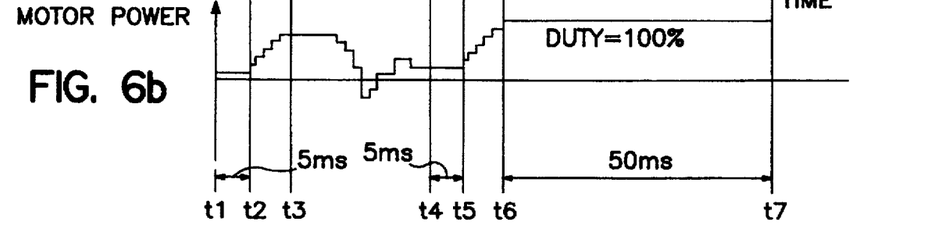

FIGS. 6a and 6b are graphs showing an example of an end point detection performed according to the above-described operational processes. FIG. 6a shows subject/lens position on the vertical axis and time on the horizontal axis. FIG. 6b shows motor power on the vertical axis and time on the horizontal axis.

In FIGS. 6a and 6b, beginning at time t1 when the residual drive amount i has not changed in 5 msec, corresponding to five (5) repetitions of the interval interruption operational process (time t2 in FIGS. 6a and 6b), the drive duty value DUTY is increased 5% at a time. In this manner, the drive duty value DUTY is gradually increased, and when the photographic lens 12 begins to move (time t3), the drive duty value DUTY1, determined based on the residual drive amount i and the ideal speed V, is provided by the motor drive 18. The photographic lens 12, is driven as far as the target drive position while the drive speed is controlled to follow the ideal speed.

Further, when the photographic lens 12 has reached the end point during driving (time t4), after 5 msec has elapsed the drive duty value DUTY is increased 5% at a time, until the drive duty value DUTY reaches 100% (time t5). When the drive duty value DUTY has reached 100% (time t6), after it has been confirmed that 50 msec have elapsed, corresponding to fifty (50) repetitions of the interval interruption operational process, and the residual drive amount i is unchanged (time t7), it is decided that the photographic lens 12 has reached the end point.

According to the above-described operations, in the automatic focus adjustment device in accordance with the embodiments of the present invention, when the photographic lens 12 has stopped for 5 msec during driving, due to frictional resistance, and the like, of the mechanical conversion unit 20, the drive duty value DUTY is gradually increased. By increasing the drive duty value DUTY until the photographic lens 12 begins to move, the photographic lens smoothly begins to move at a drive duty value DUTY close to the minimum, and is accurately driven to the focus position.

Further, because the photographic lens 12 reaches the end point when the photographic lens 12 is stopped in a state of being driven at a 100% drive duty value DUTY for 50 msec, erroneous end point detection decisions can be reliably prevented.

Furthermore, in accordance with embodiments of the present invention, it is decided, based on the change of the residual drive amount i with respect to time whether or not the photographic lens 12 has stopped. However, the present invention is not limited to deciding whether the photographic lens is stopped based on the change of residual drive amount i with respect to time. For example, whether or not the photographic lens 12 has stopped may be decided based on the change of the lens position c with respect to time. Further, it may be decided whether or not the photographic lens 12 has stopped by deciding whether or not the change of the count value b of the number of output pulses of the rotation detection unit 21 is about zero. Furthermore, a means to detect the back electromotive force of the motor 19 may be used to decide that the photographic lens 12 has stopped when the back electromotive force is about zero.

Moreover, in accordance with embodiments of the present invention, when the end point is detected, the drive duty value DUTY is made zero; however, the present invention is not limited to making the drive duty value DUTY zero when the end point is reached. For example, the drive duty value DUTY may be reduced until the mechanical stress of the mechanical conversion unit 20 is at a permissible level.

Furthermore, in accordance with embodiments of the present invention, the actuation amount E is calculated based on the residual drive amount i and the ideal speed V; however, the present invention is not limited to this method of calculating the actuation amount E, and the necessary actuation amount E to cause the photographic lens 12 to move by the residual drive amount i may be calculated, for example, based on open loop control or fuzzy control or other control method.

Moreover, in accordance with embodiments of the present invention, end point detection continues to be performed even after the photographic lens 12 has reached the target drive position PO. However, the present invention is not limited to this type of end point detection. For example, after determining that the photographic lens 12 has reached the target drive position PO when the actuation amount E, calculated by Equation 2 above, reaches a value of about zero, inhibition means can be arranged to inhibit the process of causing the drive duty value DUTY to increase. By inhibiting the process of causing the drive duty value DUTY to increase, with the photographic lens 12 stopped at the target drive position PO, erroneous detection that the photographic lens 12 is at the end point can be prevented.

Furthermore, embodiments of the present invention are described as applied to a camera; however, the present invention is not limited to application to a camera, and the present invention can be generally applied to any type of optical systems using imaging lenses such as in optical pickups for optical disks, and the like.

In the automatic focus adjustment device in accordance with the preferred embodiments of the present invention, when the photographic lens has been stopped by frictional resistance and like reasons, because the actual actuation amount is gradually increased within a permissible range, the photographic lens begins to move smoothly at an actual actuation amount close to the minimum, and the photographic lens can be reliably caused to reach the focus position.

Moreover, in accordance with embodiments of the present invention, when the actual actuation amount has exceeded the permissible range, and when the lens position does not change, it is determined that the photographic lens is at its end point. Therefore, there are no cases in which it is erroneously determined that the photographic lens is at the end point when the photographic lens is stopped due to friction and the like.

In the automatic focus adjustment device in accordance with the embodiments of the present invention, when determining whether or not the end point has been reached, because the predetermined second time period is made longer than the predetermined first time period, there is no erroneous decision that stopping of the photographic lens for a short time is the end point, and reliable detection of the end point can be performed.

In accordance with embodiments of the present invention, in optical equipment to which the present invention has been applied, correct performance of the end point detection of a photographic lens, reliable driving the photographic lens to its end point, and also smooth focus adjustment are achieved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An automatic focus adjustment device, comprising:

a photographic lens;

a drive to drive the photographic lens in an optical axis direction;

a defocus amount detection device to detect a defocus amount which is a position deviation of the image of the subject formed by the photographic lens from an image forming plane;

an actuation amount calculation device to calculate an actuation amount necessary to drive the photographic lens a distance corresponding to the detected defocus amount;

an actual actuation amount setting device to set an actual actuation amount to be output to the drive;

a lens position detection device to detect a position of the photographic lens;

an actual actuation amount decision device to decide whether the actual actuation amount output to the drive is within a permissible range predetermined for the drive;

a first lens displacement decision device to decide whether the lens position detected by the lens position detection device remains the same for a first predetermined time period during lens drive, and a second lens displacement decision device to decide whether the lens position detected by the lens position detection device remains the same for a second predetermined time period during lens drive, wherein the actual actuation amount setting device, in a first case, when the actual actuation amount decision device decides that the actual actuation amount is outside the permissible range and the second lens displacement decision device decides that the lens position remains the same, decreases the actual actuation amount, and in a second case, when the first lens displacement decision device decides that the lens position remains the same and the second lens displacement decision device decides that the lens position does not remain the same, sets the larger of the actual actuation amount presently output to the drive, increased by a predetermined amount, and the actuation amount calculated by the actuation amount calculation device as the actuation amount, and in a third case, when the first lens displacement decision device decides that the lens position does not change, sets the actuation amount calculated by the actuation amount calculation device as the actual actuation amount.

2. An automatic focus adjustment device, as recited in claim 1, wherein the predetermined second time period is set longer than the predetermined first time period.

3. An automatic focus adjustment device to focus an image of a subject on an image forming plane with a photographic lens, comprising:

a defocus amount detection device to detect a position deviation of the image of the subject formed by the photographic lens from the image forming plane;

a drive to drive the photographic lens;

a lens position detection device to detect the position of the photographic lens;

a first lens displacement decision device to determine whether the lens position detected by the lens position detection device remains the same for a first predetermined time period during lens drive;

an actuation amount setting device to set an actuation amount output to the drive according to the defocus amount detected by the defocus amount detection device in response to the first lens displacement decision device determining that the lens position does not remain the same for the first predetermined time period and to increase the actuation amount output to the drive in response to the first lens displacement decision device determining that the lens position remains the same for the first predetermined time period;

an actual actuation amount decision device to determine whether the actuation amount output to the drive is within a permissible range predetermined for the drive; and a second lens displacement decision device to determine whether the lens position detected by the second lens position detection device remains the same for a second predetermined time period during lens drive, wherein the actuation amount setting device decreases the actuation amount output to the drive when the actual actuation amount decision device determines that an actuation amount outside the permissible range has been applied to the drive and the second lens displacement decision device determines that the lens position remains the same for the second predetermined time period.

4. An automatic focus adjustment device as recited in claim 3, wherein the actuation amount setting device sets the larger of the present actuation amount output to the drive increased by a predetermined amount and the actuation amount set according to the defocus amount as the actuation amount output to the drive, when the first lens displacement decision device decides the lens position remains the same for the first predetermined time period, the actual actuation amount decision device determines that an actuation amount outside the permissible range has been applied to the drive device and the second lens decision device decides that the lens position does not remain the same for the second predetermined time period.

5. An automatic focus adjustment device as recited in claim 3, wherein the predetermined second time period is set longer than the predetermined first time period.

6. An automatic focus adjustment device as recited in claim 4, wherein the actuation amount setting device sets a duty for the drive according to the respective decisions of the first and second lens displacement decision devices.

7. An automatic focus adjustment device as recited in claim 3, wherein the first predetermined time period is five milliseconds, the second predetermined time period is fifty milliseconds and the drive duty is incrementally increased by five percent.

8. An automatic focus adjustment device for a photographic lens, comprising:

a defocus amount detection device to detect an amount of defocus of the photographic lens;

a drive to drive the photographic lens to a focused state according to a drive duty based on the detected defocus amount;

a lens position detection device to detect a position of the photographic lens;

a first lens displacement decision device to determine whether the lens position does not change for a predetermined period of time during drive of the photographic lens;

a second lens displacement decision device to determine whether the drive duty is a maximum and the lens position has not changed for a second predetermined time period while the drive duty is a maximum; and a control unit to incrementally increase the drive duty based on the detected defocus amount until the photographic lens begins to move in response to the first lens displacement decision device determining that the photographic lens has not moved for the predetermined period of time, wherein the control unit sets the drive duty to zero to stop drive of the photographic lens in response to a determination by the second lens displacement decision device that the drive duty is a maximum and the lens position has not changed for the second predetermined time period.

9. An automatic focus adjustment device as recited in claim 8, wherein the predetermined time period is five milliseconds, the second predetermined time period is fifty milliseconds and the drive duty is incrementally increased by five percent.

10. An automatic focus adjustment device as recited in claim 8, where in the drive duty is calculated by the control unit according to a target drive amount based on the defocus amount, a residual drive amount based on a lens position and the target drive amount, and an ideal speed determined according to the residual drive amount.

11. An automatic focus adjustment device for a photographic lens, comprising:

a defocus amount detection device to detect an amount of defocus of the photographic lens;

a drive to drive the photographic lens to a focused state according to a drive duty based on the detected defocus amount;

a lens position detection device to detect a position of the photographic lens;

a lens displacement decision device to determine whether the lens position does not change for a predetermined period of time during drive of the photographic lens; and a control unit to incrementally increase the drive duty based on the detected defocus amount until the photographic lens begins to move in response to the lens displacement decision device determining that the photographic lens has not moved for the predetermined period of time, wherein the predetermined time period is five milliseconds and the drive duty is incrementally increased by five percent.

* * * * *